Sept. 29, 1970 J. W. WARD 3,531,208

AUTOMATIC DIGITAL COLORIMETER

Filed May 10, 1966 4 Sheets-Sheet 1

INVENTOR.

John W. Ward

John W. Ward INVENTOR.

Sept. 29, 1970 J. W. WARD 3,531,208

AUTOMATIC DIGITAL COLORIMETER

Filed May 10, 1966 4 Sheets-Sheet 3

John W. Ward INVENTOR.

John W. Ward INVENTOR.

3,531,208
AUTOMATIC DIGITAL COLORIMETER
John W. Ward, Charlottesville, Va., assignor to Teledyne, Inc., Hawthorne, Calif.
Filed May 10, 1966, Ser. No. 548,966
Int. Cl. H01s 3/50; G08c 9/00
U.S. Cl. 356—176 6 Claims

ABSTRACT OF THE DISCLOSURE

This digital colorimeter functions in CIE color notation and reads directly in CIE tristimulus values X, Y and Z in CIE chromaticity coordinates $x$ and $y$ and tristimulus value Y. The present invention differs from earlier colorimeters in that its operation is entirely automatic; once initiated, either by an internal timing cycle or an external operation, it uses a combination of an internal sequence timer and a manually-set logic to cause the measurement, calculation, display and encoding of the colorimetric data for a specific sample in less than one-half of a second. Accuracy of measurement and calculation is to greater than three significant figures. Provision is made for internal calibration. Colorimetric evaluation is based on a 4-filter photovoltaic cell system, with a constantly-monitored illumination source. The numerical values, representing sample coloration, are computed from electrical analogs of illumination and sample spectral distribution by means of operational amplifiers, conversion of the colorimetric values to a time interval with a precise integrator, measuring the duration of the time interval with an accurate clock and counter and displaying and encoding this data for utilization.

This invention relates to an automatic digital colorimeter reading directly in CIE chromaticity notation and is related to the colorimeter described in my issued Pat. No. 3,060,790.

The art of textile dyeing is an ancient one. To the uninitiated, the subtleties of color determination and color shade adjustment routinely accomplished by the textile dyes seem, at times, to border on the occult. The uncanny color sense of these skilled artisans presents a real challenge to those engaged in the emerging science of color identification and color difference determination by instrumental means.

CIE COLOR NOTATION

Characteristics of various color notation and specification systems have been set forth in considerable detail in the technical journals and texts of the last 35 years. Of these color notation systems, the most generally used, and therefore the most completely documented, is that of the Commission Internationale de l'Eclairge (CIE). The CIE color notation system is based on a set of three unique color stimulus specifications, which in their fundamental condition, are called tristimulus values. These tristimulus values are a mathematical transformation from the inconvenient mixture relationships of a set of three real primaries, capable of matching any color, to a set of three non-real primaries which are mathematically more convenient. The CIE tristimulus values are denoted as X, Y, and Z and, when used as a color stimulus specification, represent the quantities of the non-real primaries required to match the color so specified. This tristimulus specification has a physiological counterpart in the trireceptor concept of human vision which has just begun to be substantiated after a century of debate.

An object of the present invention is to provide a colorimeter reading directly in CIE chromaticity notation.

Another object is to provide a colorimeter which will determine chromaticity notation or values of fabrics or other objects rapidly and accurately.

A further object is to provide a colorimeter which will display numerical data representing the chromaticity of the fabric or other object under test.

An additional object is to provide a colorimeter which will produce data as a direct visual display and in binary encoded decimal 7-bit alpha numeric code for data processing digital computers.

Another object is to provide a colorimeter which will have several modes of operation or display, including chromaticity coordinates, tristimulus values and metameric ratio.

Other objects will be evident in the following description:

My automatic digital colorimeter features near-instantaneous readout, to greater than three significant figures, in either CIE tristimulus values or in chromaticity coordinates. High reliability solid state construction is used throughout. Applications for my device and system include laboratory colorimetry, production sample evaluation and continuous process control.

Colorant formulation by instrumental means requires rapid, precise evaluation of the individual colorants in a practical coloration process. Spectrophotometry permits detailed evaluation of the characteristics of colorants and is invaluable in initial formulation of colorant recipes. Colorimetry, if precisely and expeditiously performed, can provide all information necessary to maintain or correct process colorant formulations. It is the purpose of this invention to provide a newly developed automatic digital colorimeter whose characteristics conform to the requirements of process control instrumentation.

The characteristics of the CIE tristimulus value sensors for illuminant C are well known and will not be reviewed here. It will suffice to say that this digital colorimeter utilizes four filter/photocell combinations to produce tristimulus value responses equivalent to the blue and red components of X as well as the usual Y and Z responses. It is essential that a four filter system be utilized in order to accurately conform to CIE color notation, particularly in the 475 to 530 millimicron region where a significant non-identity exists between the X-blue and Z responses. Reference is made to my Pat. No. 3,060,790.

COLORIMETER OPTICAL SYSTEM

Any colorimeter begins with the detection or sensing of the energy reflected from or transmitted thru the sample under specific illumination conditions.

In this new colorimeter, three 150-watt "sealed beam" protection spot bulbs illuminate the sample. An infrared absorbing filter made of PPG 2043 glass is interposed between lamp and sample. The resulting sample illumination is in excess of 10,000 foot-candles over an area approximately 3 inches in diameter, yet contains little residual heat. Illumination is at the CIE recommended incidence angle of 45°, with the lamps dispersed on 120° centers, effectively suppressing texture effects which may be present in materials such as woven textiles.

The sensor optical system is a multilenticular arrangement of fifty-five light pipes with the distribution being assigned to the indivdual photocells in accordance with the filter density and required energy level of each sensor.

Figure 1:
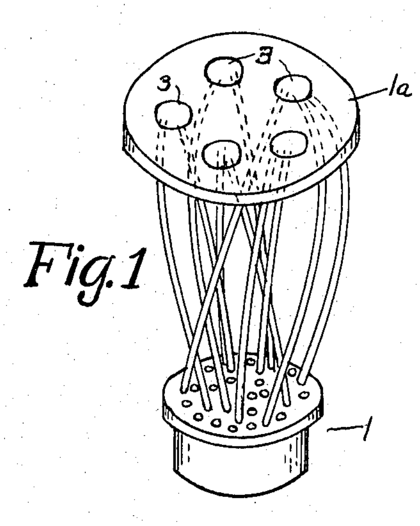
FIG. 1 is an oblique view of a light pipe assembly.
Figure 3:
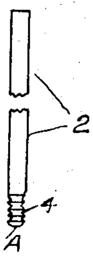
FIG. 3 is a fragmentary side view of one of the light. Pipes are used in the device of FIG. 1.

A partially assembled light-pipe system, FIG. 1, shows the method of assignment of the various light pipes to the individual sensors. The light-pipe system is described in my co-pending application, Ser. No. 392,253 filed Aug. 26, 1964 an entitled Light Distribution Device and System. The light-gathering ends of the solid light pipes of flexible clear plastic are placed in suitable holes in disc 1 (FIG. 1) which may be of opaque plastic or other material. The light collecting ends A of the light pipes may be curved in the form of lenses as indicated in FIG. 3. The lens ends of the light pipes 2 may be fluish with the bottom surface of apertured member 1 or they may project slightly beyond. The pipes are arranged so that each of the light-emitting apertures, lenses, or the like, 3 in disc 1*a*, will receive light from various separated areas of member 1, thereby producing an averaging effect of the illumination on the bottom surface of that member. This bottom surface is arranged to receive light from the fabric or other means illuminated for test purposes. Photocells placed near windows or lenses 3 sense the illumination through suitable filters not shown.

FIG. 3 is an enlarged detail of the lens portion of a typical light pipe. The lens radius is so chosen that the viewed area in a 2-inch diameter circle at a distance of 4 inches. The image of this area is focused within the light pipe at the focal plane, determined by the last of the last of the series of annular rings or ridges 4. These rings are roughened and blackened to perform a function similar to that of the bellows in a camera. Only energy from the sample area forms the image, and by total internal reflection, this energy is transmitted through the light pipe to the filter and photocell, located at the opposite end. The cluster of light pipes is arranged about an axis perpendicular to the sample surface and conforms to the CIE viewing recommendation. The solid viewing angle substended by the sensor is 30 degrees centered about the optical axis.

A 3-inch unobstructed viewing distance is maintained between any portion of the sensor and the sample surface. This permits accurate evaluation of wet, hot, moving or fluid samples, without physical contact.

PHOTOCELLS

Selenium photovoltaic photocells are used in this system. These cells have several desirable features, among which are known and stable spectral response, extreme reliability, and essentially infinite life. They have, unfortunately, an extremely low conversion efficiency, approximately 1%, so that photocell currents of 1 to 10 microampheres are the typical case. Five photocells are used: one each for the $X_B$, $X_R$, Y, and Z tristimulus value sensors, and one as an illumination sensor. Reflectance is subsequently computed from this illumination response and the Y tristimulus response.

Photocells are maintained at a constant 48° C. temperature by an integral heater assembly which is controlled by a precision mercury column thermostat and a regulator assembly. Heat dissipation within the sensor causes an internal temperature rise of approximately 7° C. This permits operation in ambient conditions of temperatures not exceeding 41° C. Heater capacity is so chosen that the 100% duty cycle condition of the heaters occurs at approximately 0° C., permitting a low temperature operating limit of approximately −5° C.

PHOTOCELL AMPLIFIERS

Figure 2:
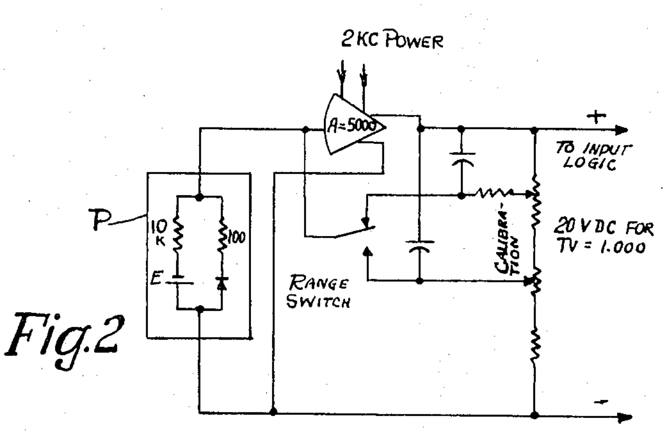
FIG. 2 is a circuit diagram of a photocell amplifier.

FIG. 2 is a block-diagram of a typical photocell amplifier and its associated circuit. The amplifier is of the carrier type operating at a requency of 2 kc. It has an open loop gain of aprpoximately 5000 and uses negative current feedback to achieve gain stabilization. Photocell P characteristics are most favorable when the cell terminal voltage approaches zero. This effect is achieved by the feedback circuit, in which a current derived from the amplified output opposes the cell current to produce a near-null at the amplifier input. The equivalent circuit of photocell P is indicated. Voltage output E varies as the light varies.

The output voltage of these photocell amplifiers is 20 v. DC for a tristimulus value of 1.000. There are five such amplifiers: one for each of the sensor photocells. All are transformer operated, from a 2 kc. power oscillator, and, therefore, may be switched in any configuration to suit the input logic requirements of the subsequent computer.

INPUT LOGIC

The input logic is a series of nineteen encapsulated reed relays, constituting means to set up many different equations for subsequent solution and actuated in a specific order, depending upon the mode of operation and a timing sequence.

Figure 4:
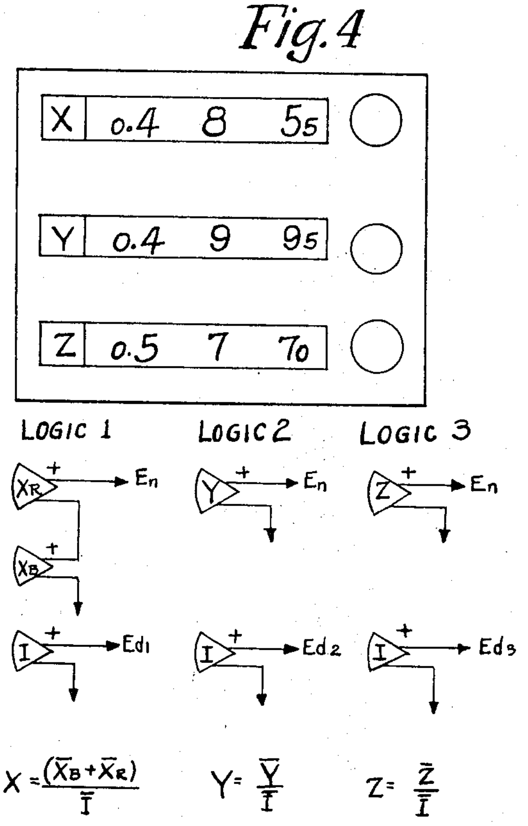

FIG. 4 depicts the input logic for the three timing sequences of the tristimulus value mode and the visual readout for the mode. The first step of the mode compares the sum of the voltages from the two X photocell amplifiers ($\overline{X}_B+\overline{X}_R$) to the voltage $\overline{I}$ from the illumination photocell amplifier. This comparison gives, as a resultant, tristimulus value X. The second step compares photocell amplifier voltages $\overline{Y}$ and $\overline{I}$ to give tristimulus value Y. The third logic step compares voltages $\overline{Z}$ and $\overline{I}$ to yield tristimulus value Z.

Figure 5:
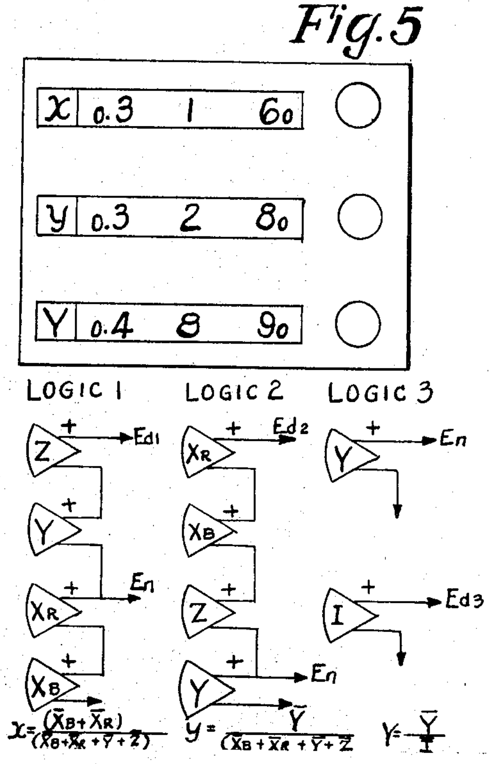
FIG. 5 is a representation of chromaticity coordinate mode input logics.

FIG. 5 shows the input logic configuration for the chromaticity coordinate mode of operation and its visual readout for the mode. The equations to be solved are in sequence.

Figure 6:
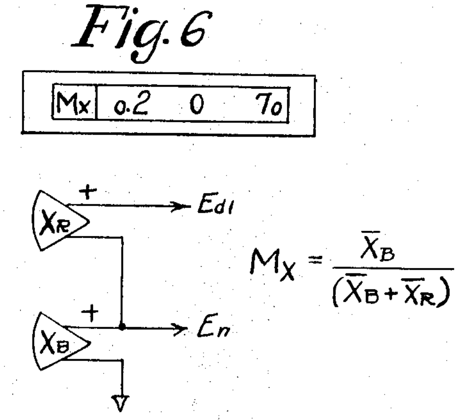
FIG. 6 is a representation of a metameric ratio mode input logic.

FIG. 6 is the input logic setup for the single step calculation of metameric ratio an its readout.

Table I shows, for each input logic, the various mode/logic selections and the assignment of the resulting signals to the computation portion of the equipment. As an aid to system calibration, two calibration modes are provided as indicated.

SEQUENCE TIMER

Figure 7:
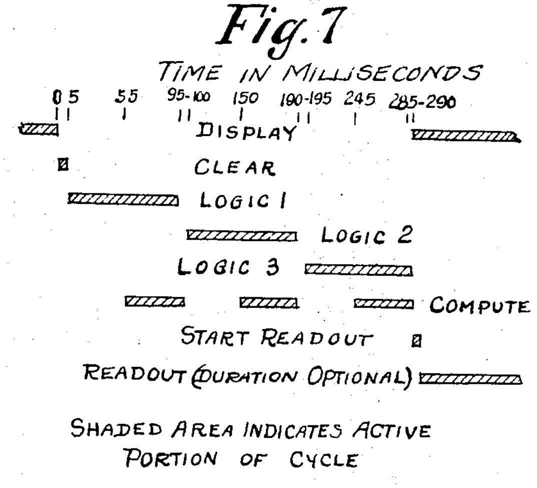
FIG. 7 illustrates a sequence of operations.

The steps of the operational sequence are under control of a sequence timer, FIG. 7. The first step in an analysis sequence is to clear the previously computed values from the computation circuits. Simultaneously, the visual numerical display is blanked. Logic 1 is then enabled, setting the proper input logic for step 1 and enabling the first computation circuit. After a settling period of 50 milliseconds, a 40 millisecond compute gate is actuated. This gate permits the solution of the particular equation set by the input logic. The compute gate is followed by a clear logic interval of 5 milliseconds, which permits deactuation of all of the input logic relays. This sequence of events repeats three times. Completion of the third step returns the display gate, thereby presenting the numerical information on the visual display and signalling completion of the data cycle. Numerical values are stored in the computation circuits until cleared by the next operating sequence.

Inhibiting circuits are included as protective measures to prevent malfunction should the operation or utilization apparatus request some function which would disturb the computational sequence of the colorimeter.

TABLE I.—INPUT MODE/SEQUENCE SELECTIONS AND SIGNAL ASSIGNMENTS

| Mode | Logic 1 Problem | Logic 1 $E_n$ | Logic 1 $E_{d1}$ | Logic 2 Problem | Logic 2 $E_n$ | Logic 2 $E_{d2}$ | Logic 3 Problem | Logic 3 $E_n$ | Logic 3 $E_{d3}$ |
|---|---|---|---|---|---|---|---|---|---|
| Tristimulus Values | $X=\frac{E_n}{E_{d1}}$ | $\bar{X}_B+\bar{X}_R$ | $\bar{I}$ | $Y=\frac{E_n}{E_{d2}}$ | $\bar{Y}$ | $\bar{I}$ | $Z=\frac{E_n}{E_{d2}}$ | $\bar{Z}$ | $\bar{I}$ |
| Chromaticity Coordinates | $x=\frac{E_n}{E_{d1}}$ | $\bar{X}_B+\bar{X}_R$ | $\bar{X}_B+\bar{X}_R+\bar{y}+\bar{z}$ | $y=\frac{E_n}{E_{d2}}$ | $\bar{Y}$ | $\bar{X}_B+\bar{X}_R+\bar{Y}+\bar{Z}$ | $\bar{Y}=\frac{E_n}{E_{d3}}$ | $\bar{Y}$ | $\bar{I}$ |
| Metameric Ratio | $M_X=\frac{E_n}{E_{d^1}}$ | $\bar{X}_B$ | $\bar{X}_B+\bar{X}_R$ | ---- | ---- | ---- | ---- | ---- | ---- |
| Calibrate $X_B$ and $X_R$ | $I=\frac{E_n}{E_{ds}}$ | $\bar{I}$ | +10 v. DC | $X_B=\frac{E_n}{E_{ds}}$ | $\bar{X}_B$ | $\bar{I}$ | $X_R=\frac{E_n}{E_{ds}}$ | $\bar{X}_R$ | $\bar{I}$ |
| Calibrate Y and Z | $I=\frac{E_n}{E_{ds}}$ | $\bar{I}$ | +10 v. DC | $Y=\frac{E_n}{E_{ds}}$ | $\bar{Y}$ | $\bar{I}$ | $Z=\frac{E_n}{E_{ds}}$ | $\bar{Z}$ | $\bar{I}$ |

Where:
$E_n$=voltage in numerator.
$E_d$=voltage in denominator; numbers 1, 2, and 3 indicate logic number, and letters indicates standard.
A bar over a quantity indicates output voltage from photocell amplifier.

My digital colorimeter is equipped to provide readout in binary encoded decimal (BCD) for external utilization apparatus. When this data is required, a readout timer, initiated by the last step of the sequence timer, causes the stored information to be read out to the external apparatus. BCD data is acceptable to a digital computer or to a printer, such as the Friden Flexowriter or the IBM Selectric Typewriter. The data cycle may be initiated on demand, either manually or by an external "contact operate" signal, or at present 1, 5, 10 or 20 second automatic intervals.

The stored data can be typed out or entered into a computer in the 5, 10, 20 second, or demand modes. The actual data cycle is approximately 285 milliseconds and the readout cycle approximately 1.5 seconds depending, of course, upon external readout apparatus. Data injection to a digital computer can be accomplished in less than 100 milliseconds.

INTEGRATOR

Figure 8:
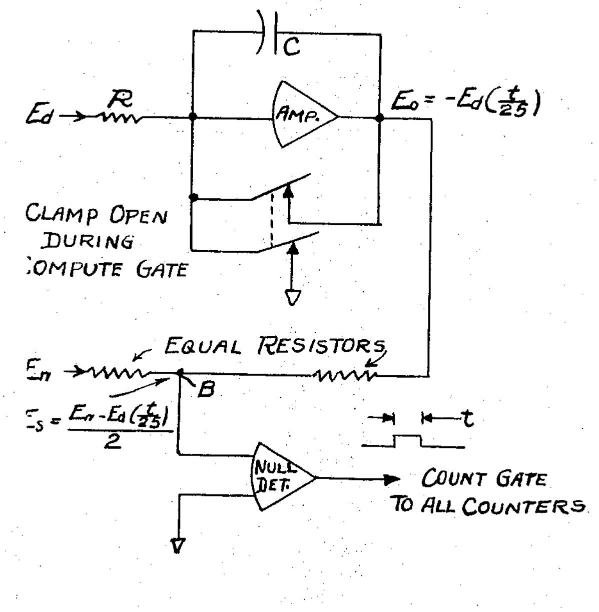
FIG. 8 is a circuit diagram of an integrator and null detector.

Precise measurement of voltage ratios can conveniently be accomplished by converting the voltage ratios to a time interval and accurately measuring the duration of this interval. In this colorimeter, all the input equations are reduced to the ratio of two voltages. These voltage ratios have limiting values of zero and unity. The denominator voltage $E_d$ can have values from 5 to 70 v. DC, while the numerator voltage $E_n$ ranges from 0 to 25 v. DC. A convenient method of obtaining a timing pulse whose duration is proportional to the ratio of two voltages involves the use of an integrator and null detector as shown in FIG. 8. The denominator voltage is applied to the input of a clamped integrator, which has a time constant of 25 milliseconds and a gain of approximately 2500. This is an inverting integrator and its output voltage $E_o$ is given by:

$$E_o=-E_d(t/25)$$

whree $E_d$ is the applied denominator voltage and $t$ is the time in milliseconds from the instant the integrator is unclamped. The clamping action is accomplished by solid-state switches, not the mechanical ones diagrammed. The sequence timer controls the integrator and allows the output voltage to begin its excursion at the start of the compute gate. The integrator provides a count gate which starts at the same instant. Numerator voltage $E_n$ is compared at a summing junction B with output voltage $E_o$ and, when these two voltages are equal, a null detector at the summing junction terminates the count gate and reclamps the integrator. In the event that a solution is not reached in 40 milliseconds, the count gate is terminated by the end of the compute gate.

In the tristimulus value and chromaticity coordinate modes, the integrator sequence is repeated three times: once for each problem solution. The resulting count gates are then proportional to the ratios of $E_n/E_d$.

THE COUNTERS

The duration of the count gate is proportional to the numerical value of the voltage ratio and is converted to a digital quantity by counting clock pulses during the count gate interval. A 320 kc. crystal clock, provides a stable source of clock pulses. These pulses are fed to three counters in parallel, as are the count gates from the integrator. Each counter is enabled by the appropriate input logic step. The simultaneous application of clock pulses, enabling gate, and count gate accumulates a count proportional to the count gate time, and thereby proportional to the numerical ratio of the two voltages in the desired equation.

Figure 9:
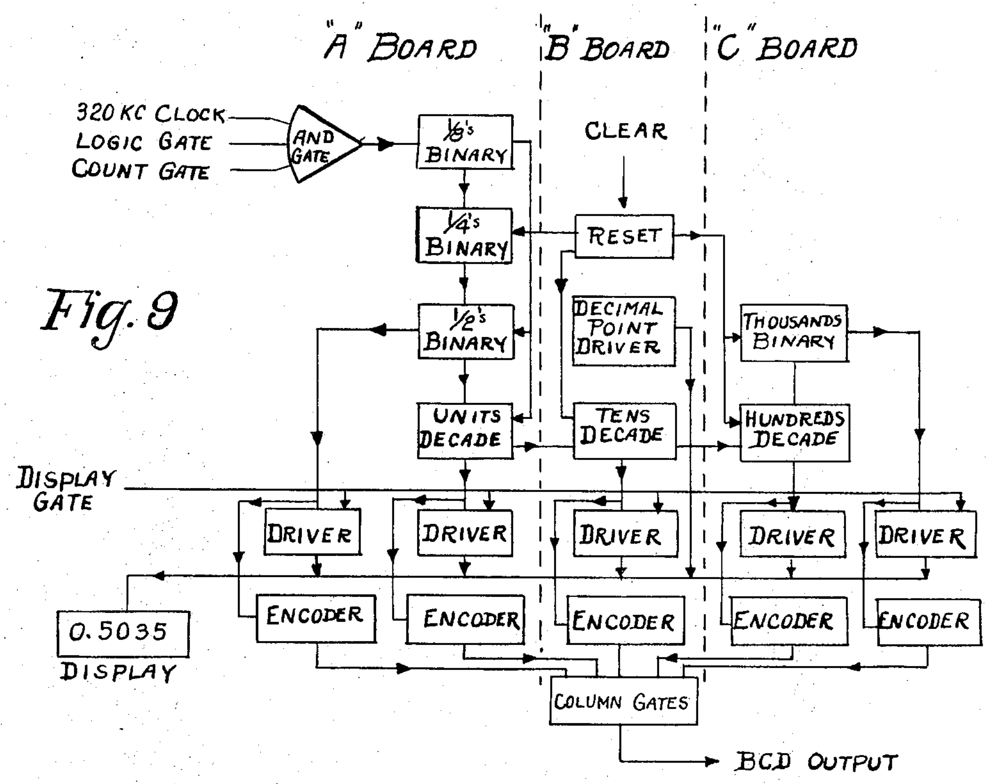
FIG. 9 is a block diagram of a gate, counter, and encoder.

The first three stages of the counter, FIG. 9, are typical binary scalers, while the next three stages utilize neon ring counter tubes in a decade configuration, followed by a final binary stage which stores over-capacity counts.

Counter tubes were selected on the basis of performance characteristics as well as economics. The ring counter has the significant advantage of a direct visual readout of its count condition without reference to external apparatus. Additionally, the decade function of this counter is ideally suited to decade numerical display. The upper frequency limit of the counter tubes is approximately 50 kc., necessitating the use of faster binary stages for the less significant count bits. The first binary counts at 320 kc. (eighths); the second at 160 kc. (quarters); and the third at 80 kc. (halves). The first decade count is at 40 kc. (units); the second 4 kc. (tens); and the third at 400 c.p.s. (hundreds). A final binary accumulates in excess of 1000 and serves as an over-limit warning. Only halves, units, tens, hundreds, and thousands quantities are actually displayed, eights and quarters are suppressed.

The counter is subdivided into three plug-in-circuit board assemblies which are completely interchangeable with other sub-assemblies of like types.

Table II shows the 7-bit alphameric BCD code provided for the readout of the counter information. Various readout timers can present this information either serially by character, parallel by character, or in any combination. Readout of the stored numerical data can be initiated either by external command or interval timer. Conversion to codes other than the common 7-bit alphameric requires a translator board in the colorimeter. Any code requiring not more than 7 bits can be accommodated.

TABLE II

| Numeric Character | Check Bit C | Zone Bits BA | 8 | 4 | 2 | 1 | Bit Total Parity Check |
|---|---|---|---|---|---|---|---|
| 0 | 0 | 00 | 1 | 0 | 1 | 0 | 2 |
| 1 | 1 | 00 | 0 | 0 | 0 | 1 | 2 |
| 2 | 1 | 00 | 0 | 0 | 1 | 0 | 2 |
| 3 | 0 | 00 | 0 | 0 | 1 | 1 | 2 |
| 4 | 1 | 00 | 0 | 1 | 0 | 0 | 2 |
| 5 | 0 | 00 | 0 | 1 | 0 | 1 | 2 |
| 6 | 0 | 00 | 0 | 1 | 1 | 0 | 2 |
| 7 | 1 | 00 | 0 | 1 | 1 | 1 | 3 |
| 8 | 1 | 00 | 1 | 0 | 0 | 0 | 2 |
| 9 | 0 | 00 | 1 | 0 | 0 | 1 | 2 |

1, indicates closed contact on voltage present.
0, indicates open contact on voltage absent.

Bit total must be an even number (2, 4, 6) to verify code.

POWER SUPPLY

Power for the entire apparatus is supplied by a silicon controlled rectifier precision AC regulated supply. A portion of this supply provides the regulated voltage for the sensor lamps while a minor fraction is diverted to the colorimeter computer portion. The power supply also used plug-in assemblies for simplified maintenance. The computer portion of the colorimeter consumes approximately 19 watts, the lamps and ventilating fans, another 500 watts, and the visual display, approximately 35 watts. System power, including the losses of the regulator, is approximately 600 watts of commercial 115 v., 60 c.p.s. power.

SYSTEM CONFIGURATION

Figure 10:
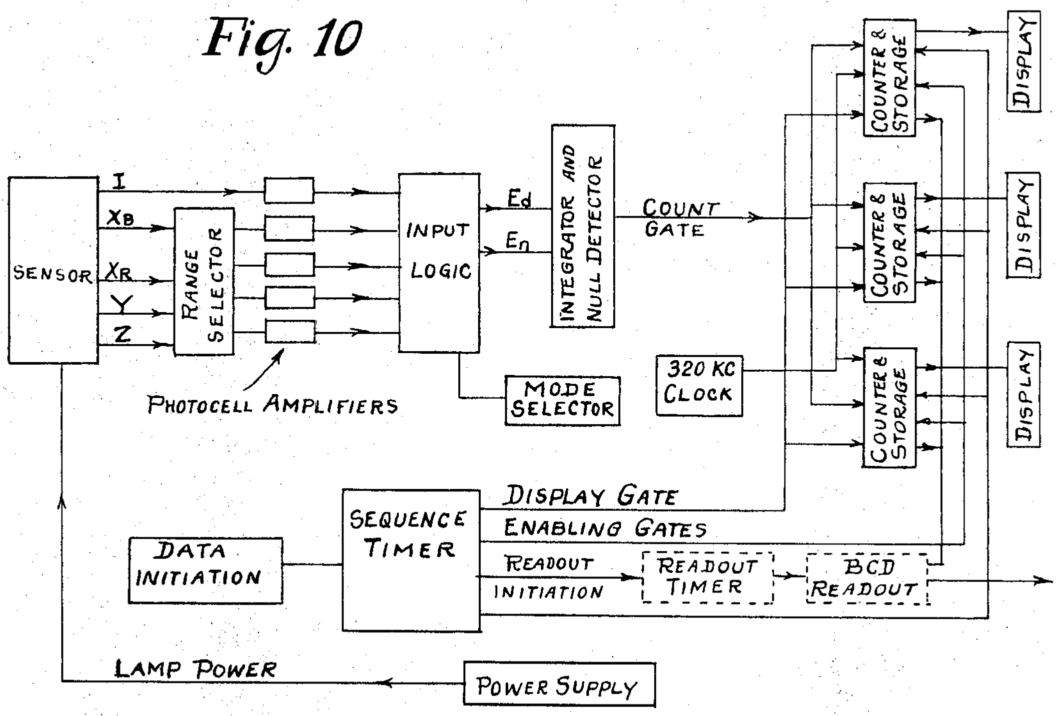
FIG. 10 is an overall block diagram of my automatic digital colorimeter system.

FIG. 10 is an overall block diagram of the automatic digital colorimeter system. The sensor illuminates and views the sample, providing an electrical current analog of the four tristimulus responses and the sample illumination. The photocell amplifiers raise this analog to a useful computational level. The input logic and sequence timer select the equation parameters and enable the proper counters. The integrator computers a time interval proportional to the equation quotient. The counters digitize and store this quotient. The display presents the stored data for visual interpretation. Other control and timing functions, as required are supplied by sub-system of the colorimeter, which are deleted from this figure for clarity.

Figure 11:
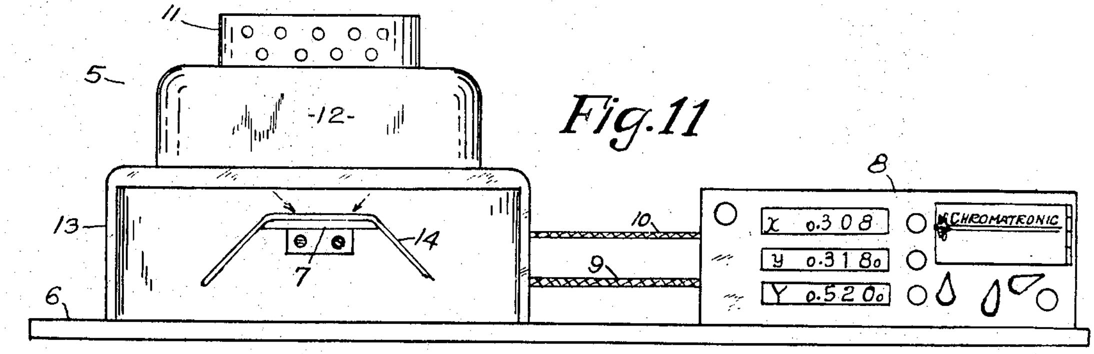
FIG. 11 is a front elevation of my automatic digital colorimeter showing the sensing unit and the connected computer unit.

FIG. 11 is an illustration of the colorimeter system set up for laboratory use. The sensor 5 is located on a rigid support structure 6 with a fixed plate 7 for location of the sample. The pedestal and sensor arrangement is that used for evaluating textile swatches and similar samples, though other configurations suitable for the product are completely possible. The colorimeter computer 8 is connected to the sensor by means of cable 9 for photocell signals, and cable 10 for power. Routing of these cables is not critical and the sensor may be located at distances up to 250 ft. from the colorimeter computer. An adjustment is included in the sensor to compensate for various cable lengths.

COLORIMETER COMPUTER

The colorimeter computer 8 is housed in a portable steel cabinet with removable top access for all plug-in-circuit boards. The front panel is arranged to tilt out to provide access to the lamps and display units. Construction of the sub-assemblies is entirely on epoxy fiber-glass circuit boards using discrete components and modern wave soldering techniques.

CALIBRATION

All calibration functions on this colorimeter can be performed entirely from the front panel of the computer. A set of ten chromatic and neutral reflectance standards is provided with each instrument to assist in maintaining the precision necessary for inter-plant standardization of color information. This set of ten color standards is specially designed to provide uniform distribution throughout color space in the region of maximum utility. The standards are traceable to National Bureau of Standards through spectrophotometric measurements of standards processed with identical glazes.

OPERATION

The colorimeter is simple to use. Standardization is accomplished by placing the selected standard in the viewing position on plate 7, selecting the operating mode and setting the data cycle to 1 second, then adjusting the three standardization controls to cause the standard values to appear on the visual displays. This procedure is the same for any operation mode. The ranges of operation are provided with tristimulus value limits of 0.1000 and 1.000. Readout resolution is in excess of three significant figures for samples as low as 1% absolute reflectance.

The unit 5 has a ventilated top portion 11 and a middle portion 12 containing the lamps, photocells, and filters. The bottom portion 13 is open in front. Sample 14 is held manually in the position shown, supported by plate 7. The lamps are energized so that light will strike the surface of the sample 14 from various directions and the reflected light from the sample will affect the photocells in accordance with the particular filters employed in conjunction therewith. The photocell outputs are carried by cable 9 to computer 8 with results already described. The plate 7, as a rest, insures that all samples will be viewed from the same position and area.

RELIABILITY

Applying statistical methods of prediction to the mean time between failures, with recommended maintenance (lamp changes each 1000 hours and general housekeeping), results in a MTBF in excess of 10,000 hours. The plug-in nature of construction and self-servicing features indicate a utilization factor of .9990, including down time for routine maintenance. If maintenance is scheduled for normally non-productive time, this predictad utilization factor improves to a minimum of .9998. These predictions are reasonable, in light of extensive laboratory testing.

PERFORMANCE EVALUATION

Figure 12:
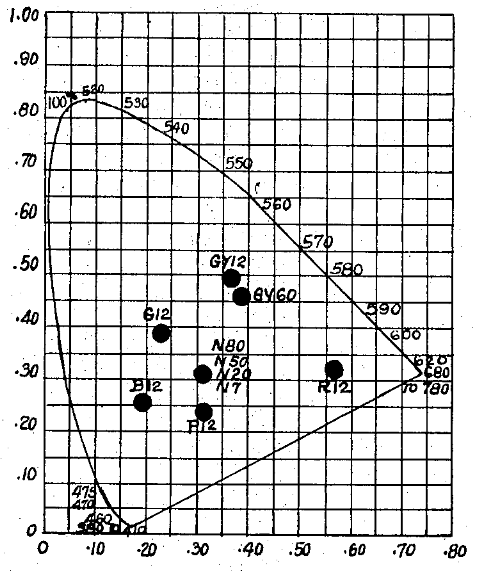
FIG. 12 is a CIE chromaticity diagram showing the location of standards in the CIE color space.

Any colorimeter is only as useful as it is accurate and sensitive. These qualities are best assessed by a long-time evaluation of the ability to measure a series of calibrated neutral and highly saturated color standards. The standards plotted on the CIE chromaticity diagram, FIG. 12, were used for this evaluation.

The test sequence required standardization of the system of a 50% neutral gray standard, followed by a series of ten tristimulus value readings, at 5-second intervals, on each of the other three neutral and six chromatic standards. This procedure was repeated for the chromaticity coordinate and metameric ratio modes. Data was recorded for subsequent reduction.

For the first 15 days, the colorimeter was operated 24 hours per day and the test sequence repeated 3 times in each 8-hour workday. For the next 5 days, the colorimeter was operated 8 hours per day and a test sequence was begun 30 minutes after daily turn-ON and repeated twice daily. For the final 5 days, the colorimeter was operated only for the time necessary to complete the three daily test sequences, and each sequence was begun 1 minute after initial turn-ON. Photocell heaters were disabled in this last test sequence, since their settling time is approximately 30 minutes at room temperature.

At the completion of the evaluation period, the massive accumulation of data was reduced to statistical standard deviations of all color standard measurements with respect to their spectrophotometrically integrated values; presented as reproducibility; and standard deviations of all measurements on a given sample with respect to the average for the immediate series of ten measurements; presented as repeatability.

Reproducibility in standard deviations

Tristimulus values—$Ds_T$=.0028
Chromaticity coordinates—$Ds_C$=.0050
Metameric ratio—$Ds_M$=.0089

Repeatability in standard deviations

Tristimulus values—$ds_T$=.00005
Chromaticity coordinates—$ds_C$=.0001
Metameric ratio—$ds_M$=.0001

APPLICATIONS TO PROCESS CONTROL

Virtually instantaneous colorimetry, with production-compatible optical sensing, brings automation one step closer to reality. Manual analog process control computers, which accept tristimulus value data and compute modifications of a preset colorant recipe, are existant. The step to automatic, digital computation of recipe corrections is now a certainty. This automatic digital colorimeter fills all the known requirements for digital color data injection to such a computer. With this significant advance in the state of the art, colorimetry can become both a laboratory science and a production process control technique.

What I claim is:

1. A photoelectric colorimeter comprising:
a light source means for illuminating an object;
suitably filtered photoelectric means for producing an electrical response proportional to the illumination of an object;
a further plurality of suitably filtered photoelectric means for producing a plurality of electrical responses, each proportional to the light received from said object, in a predetermined selected portion of the visible spectrum, by each of the said plurality of suitably filtered photoelectric means;
switching logic means for comparing any of said electrical responses generated by said photoelectric means with any other of the said electrical responses generated by said photoelectric means, either individually or in selected, predetermined combinations, and for obtaining, as a result of this comparison, further electrical responses proportional to said illumination and to said selected visible portion electrical responses and associated parameters which properly, in combination, define the color of said object in terms of conventional color specification systems;
means responsive to said further electrical responses, including integrator, null detector and gating means, to obtain a plurality of timing gate responses whose chronological duration is proportional to said further electrical responses defining the color of said object;
means for measuring the duration of said timing gate responses, including clock pulse and counting means to produce a numerical count, or quantity, proportional to the chronological duration of each of the said timing gate responses, said numerical counts or quantities thereby defining the color of said object in terms of conventional color specification systems, and further including utilization means responsive to said numerical counts or quantities for utilizing said counts or quantities.

2. The colorimetry apparatus as described in claim 1, and including sequential timing means and additional gating means controlled by said sequential timing means to control the aforesaid switching logic means thereby obtaining the aforesaid plurality of timing gate responses in a predetermined sequence.

3. The colorimetry apparatus as described in claim 1, wherein said utilization means comprises display means for displaying or indicating each of the aforesaid numerical counts or quantities thereby defining the color of the aforesaid object in terms of conventional color specification systems.

4. The colorimetry apparatus as described in claim 1, wherein said utilization means comprises encoding means and readout gate means to obtain, in conventional encoded form, including binary-encoded-decimal form, a plurality of encoded responses thereby defining the color of the aforesaid object in terms of conventional color specification systems in conventional encoded form.

5. The colorimetry apparatus as described in claim 1, and including sequential timing means and additional gating means controlled by said sequential timing means to control the aforesaid switching logic means, thereby obtaining the aforesaid plurality of timing gate responses in a predetermined sequence, wherein said utilization means comprise (a) display means for displaying or indicating each of the aforesaid numerical counts or quantities, and
(b) encoding means and readout gating means to obtain in conventional encoded form, including binary-encoded-decimal form, a plurality of encoded responses, said displayed counts or quantities and said encoded responses thereby defining the color of the aforesaid object in terms of conventional color specification systems.

6. The colorimetry apparatus as described in claim 5, and including filter and photocell means to obtain responses representative of the color of the aforesaid object in terms of the C.I.E. color specification system.

References Cited

UNITED STATES PATENTS

| | | | |
|---|---|---|---|
| 2,647,236 | 7/1953 | Saunderson et al. ---- | 88—23 X |
| 2,994,825 | 8/1961 | Anderson. | |
| 3,026,034 | 3/1962 | Couleur ------------ | 235—155 |
| 3,044,349 | 7/1962 | Watrous. | |
| 3,060,790 | 10/1962 | Ward. | |
| 3,069,013 | 12/1962 | Neubrech et al. | |
| 3,368,149 | 2/1968 | Wasserman. | |
| 3,276,012 | 9/1966 | Secretan. | |
| 3,048,270 | 8/1962 | Green et al. ------ | 356—176 X |

OTHER REFERENCES

"The Case for Digital Instruments," T. Nawalinski, International Electronics, January 1962, pp. 25–27, 38.

White, E.: "A Semiautomatic Analytical Recording Densitometer," J.S.M.P.T.E., 72, October 1963, pp. 798–803.

Drenth, J.: "An Automatic Integrating Microdensitometer," J. Sci. Instrum. 42, April 1965, pp. 222–4.

RONALD L. WIBERT, Primary Examiner

R. J. WEBSTER, Assistant Examiner

U.S. Cl. X.R.

356—177; 250—226; 340—347